United States Patent
Fansler et al.

(10) Patent No.: US 8,236,725 B2
(45) Date of Patent: Aug. 7, 2012

(54) GOLD CARBON MONOXIDE OXIDATION CATALYSTS WITH ETCHED SUBSTRATE

(75) Inventors: Duane D. Fansler, Dresser, WI (US); Thomas E. Wood, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 10 days.

(21) Appl. No.: 12/997,396

(22) PCT Filed: Jan. 14, 2008

(86) PCT No.: PCT/US2008/050966
§ 371 (c)(1),
(2), (4) Date: Mar. 14, 2011

(87) PCT Pub. No.: WO2009/091389
PCT Pub. Date: Jul. 23, 2009

(65) Prior Publication Data
US 2011/0152070 A1    Jun. 23, 2011

(51) Int. Cl.
*B01J 21/06* (2006.01)
*B01J 37/02* (2006.01)
*B82Y 40/00* (2006.01)
*B82Y 30/00* (2006.01)

(52) U.S. Cl. ......... 502/183; 502/343; 977/888; 977/773

(58) Field of Classification Search .................. None
See application file for complete search history.

(56) References Cited

U.S. PATENT DOCUMENTS

| | | | |
|---|---|---|---|
| 4,469,640 A | 9/1984 | Carcia | |
| 4,536,482 A | 8/1985 | Carcia | |
| 4,847,234 A * | 7/1989 | Hums | 502/208 |
| 5,058,578 A | 10/1991 | Weiss | |
| 5,254,596 A | 10/1993 | Irick, Jr. | |
| 5,492,627 A | 2/1996 | Hagen | |
| 5,624,667 A | 4/1997 | Maruo | |
| 5,670,247 A * | 9/1997 | Takaoka et al. | 442/340 |
| 5,789,337 A | 8/1998 | Haruta | |
| 5,817,427 A | 10/1998 | Ishida | |
| 5,932,750 A | 8/1999 | Hayashi | |
| 6,265,341 B1 | 7/2001 | Komatsu | |
| 7,243,658 B2 | 7/2007 | Deevi | |
| 7,431,905 B2 * | 10/2008 | Hancu et al. | 423/213.2 |
| 2003/0042226 A1 | 3/2003 | Coll | |

(Continued)

FOREIGN PATENT DOCUMENTS
EP    0 827 779 A    3/1998
(Continued)

OTHER PUBLICATIONS

"Photocatalytic Titanium Dioxide; ST-31", www20.inetba.com/ishiharacorpusa/item416091.ctlg, Aug. 12, 2005, 2 pages.

(Continued)

*Primary Examiner* — Melvin C Mayes
*Assistant Examiner* — Stefanie Cohen
(74) *Attorney, Agent, or Firm* — Kenneth B. Wood

(57) ABSTRACT

Applicant discloses multifunctional, highly active oxidation catalysts and methods of making such catalysts. Such methods include providing nanoparticles comprising titanium-oxo and zinc-oxo compositions, such as crystalline anatase titania nanoparticles with zinc-oxo domains on their surfaces, and etching the nanoparticles. The method also includes depositing catalytically active gold onto the nanoparticles, by, for example, physical vapor deposition.

14 Claims, 3 Drawing Sheets

U.S. PATENT DOCUMENTS

| | | | |
|---|---|---|---|
| 2003/0134741 A1 | 7/2003 | Weisbeck | |
| 2003/0187294 A1 | 10/2003 | Hagemeyer | |
| 2005/0095189 A1 | 5/2005 | Brey et al. | |
| 2006/0057355 A1* | 3/2006 | Suzuki et al. | 428/308.4 |
| 2008/0020261 A1* | 1/2008 | Hendricks et al. | 429/40 |
| 2009/0011293 A1 | 1/2009 | Wood | |
| 2009/0054230 A1 | 2/2009 | Veeraraghavan | |
| 2010/0221159 A1 | 9/2010 | Insley | |
| 2010/0273091 A1 | 10/2010 | Brey | |
| 2011/0000062 A1 | 1/2011 | Kolasa | |

FOREIGN PATENT DOCUMENTS

| | | |
|---|---|---|
| EP | 1 040 869 A2 | 10/2000 |
| GB | 1 486 108 A | 9/1977 |
| JP | 1-94945 | 4/1989 |
| RU | 2 243 033 C1 | 12/2004 |
| WO | WO 98/00413 A | 1/1998 |
| WO | WO 00/59632 A | 10/2000 |
| WO | WO 2005/115612 | 12/2005 |
| WO | WO 2005115612 A1 * | 12/2005 |
| WO | WO 2006/074126 A | 7/2006 |
| WO | WO 2007/007075 A | 1/2007 |

OTHER PUBLICATIONS

Arrii et al., Oxidation of CO on Gold Supported Catalysts Prepared by Laser Vaporization: Direct Evidence of Support Contribution; Journal of the American Chemical Society 2004; 126, 1199-1205.

Kobayashi et al., Thin Films of Supported Gold Catalysts for CO Detection; Sensors and Actuators B1 1990; 222-225.

Ma et al., "Au/MxOy/TiO2 catalysts for CO oxidation: Promotional effect of main-group, transition, and rare-earth metal oxide additives", Journal of Molecular Catalysis. A, Chemical, Elsevier, Amsterdam, NL, vol. 273, No. 1-2, Jun. 29, 2007, pp. 186-197.

Okamura et al., Preparation of supported gold catalysts by gas-phase grafting of gold acethylacetonate for low-temperature oxidation of CO and of H2; Journal of Molecular Catalysis 2003; 199, 73-84.

Veith et al., Nanoparticles of Gold on Al2O3 produced by dc magnetron sputtering; Journal of Catalysis 2004; 213, 151-158.

International Search Report, PCT/US2008/050966, Sep. 29, 2008, 4 Pages.

Ichiura, H., *Photocatalytic oxidation of $NO_x$ using composite sheets containing $TiO_2$ and a metal compound*, Chemosphere 51, Jan. 10, 2003, pp. 855-860.

* cited by examiner

US 8,236,725 B2

GOLD CARBON MONOXIDE OXIDATION CATALYSTS WITH ETCHED SUBSTRATE

CROSS REFERENCE TO RELATED APPLICATIONS

This application is a national stage filing under 35 U.S.C. 371 of PCT/US2008/050996, filed Jan. 14, 2008, the disclosure of which is incorporated by reference in its entirety herein.

BACKGROUND

Various catalysts based on combinations of titanium oxides and zinc oxides are known. For example, U.S. Pat. No. 5,254,596 to Irick, Jr., et al., discloses titanium-zinc oxide catalysts and the use of the catalysts in the manufacture of methanol and dimethyl ether. U.S. Pat. No. 5,624,667 to Maruo discloses titanium oxide particles comprising particulate titanium oxide substrate having a zinc oxy compound or a combination of a zinc oxy compound and a silicon oxy compound supported thereon. The particles are taught as being useful for pigments, catalysts, catalyst supports and absorbents.

SUMMARY

Applicant discloses herein multifunctional, highly active oxidation catalysts, and methods of making such catalysts. The catalyst is produced from nanoparticles that comprise at least titanium-oxo and zinc oxo components. Specifically, such nanoparticles possess a multi-domain composite structure having at least titanium-oxo domains and zinc-oxo domains.

In one embodiment, the multifunctional catalyst disclosed herein is produced by exposing the above-described nanoparticles to an etching process. Applicant has found that such an etching process produces a catalyst that unexpectedly has the capability to efficiently catalyze the oxidation of disparate compounds (e.g., CO and $H_2$). Such a multifunctional catalyst can thus be used for the simultaneous removal of both carbon monoxide and hydrogen from gaseous streams, and may find application in the treatment of respirable air and/or in various industrial processes. In such uses, a multifunctional catalyst may reduce the expense and complexity associated with the use of multiple catalysts.

In catalysts as disclosed herein, catalytically active gold (as described herein) is provided on the etched nanoparticles. In one embodiment, the catalytically active gold is deposited on the nanoparticles by physical vapor deposition.

In one embodiment, the nanoparticles are present in the form of aggregates of nanoparticles. In various embodiments, the nanoparticles and/or aggregates of nanoparticles comprise porosity, comprise nanoporosity, and/or comprise a Nanoporous Capacity of at least 20%, as described herein.

In one embodiment, the nanoparticles are provided on a larger host material so as to comprise a guest/host structure.

Applicant thus discloses herein a method of making a catalyst, comprising the steps of: providing a plurality of nanoparticles, wherein at least some of the nanoparticles comprise at least zinc-oxo domains and titanium-oxo domains; etching the nanoparticles with an acidic etchant so as to remove at least a portion of the zinc-oxo domains from at least some of the nanoparticles; and, depositing gold clusters of dimensions of about 0.5 nm to about 50 nm onto the etched nanoparticles.

Applicant additionally discloses herein a multifunctional highly active catalyst comprising a plurality of etched nanoparticles, prepared by a process comprising the steps of: providing a plurality of nanoparticles, wherein at least some of the nanoparticles comprise at least zinc-oxo domains and titanium-oxo domains; etching the nanoparticles with an acidic etchant so as to remove at least a portion of the zinc-oxo domains from at least some of the nanoparticles; and, depositing gold clusters of dimensions of about 0.5 nm to about 50 nm onto the etched nanoparticles.

In a particular embodiment, the etching process preferentially removes zinc-oxo material in comparison to titanium-oxo material. In a further embodiment, no zinc-oxo content is detectable on the nanoparticles after the etching process. In an alternate embodiment, zinc-oxo content is detectable on the nanoparticles after the etching process.

DRAWINGS

Figure 3:
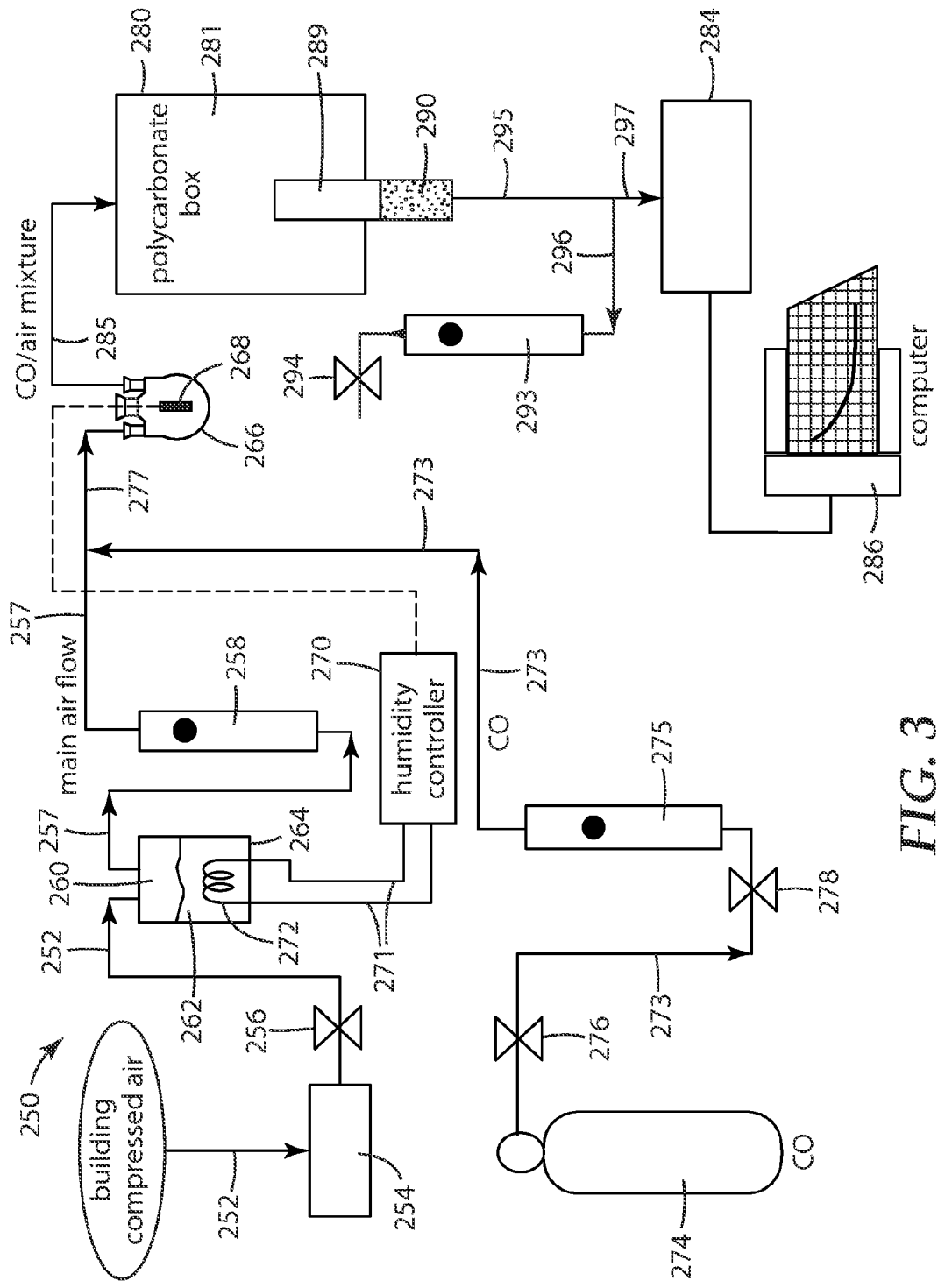

FIG. 3 schematically shows a test system used to test catalyst samples for the ability to oxidize CO.

Figure 4:
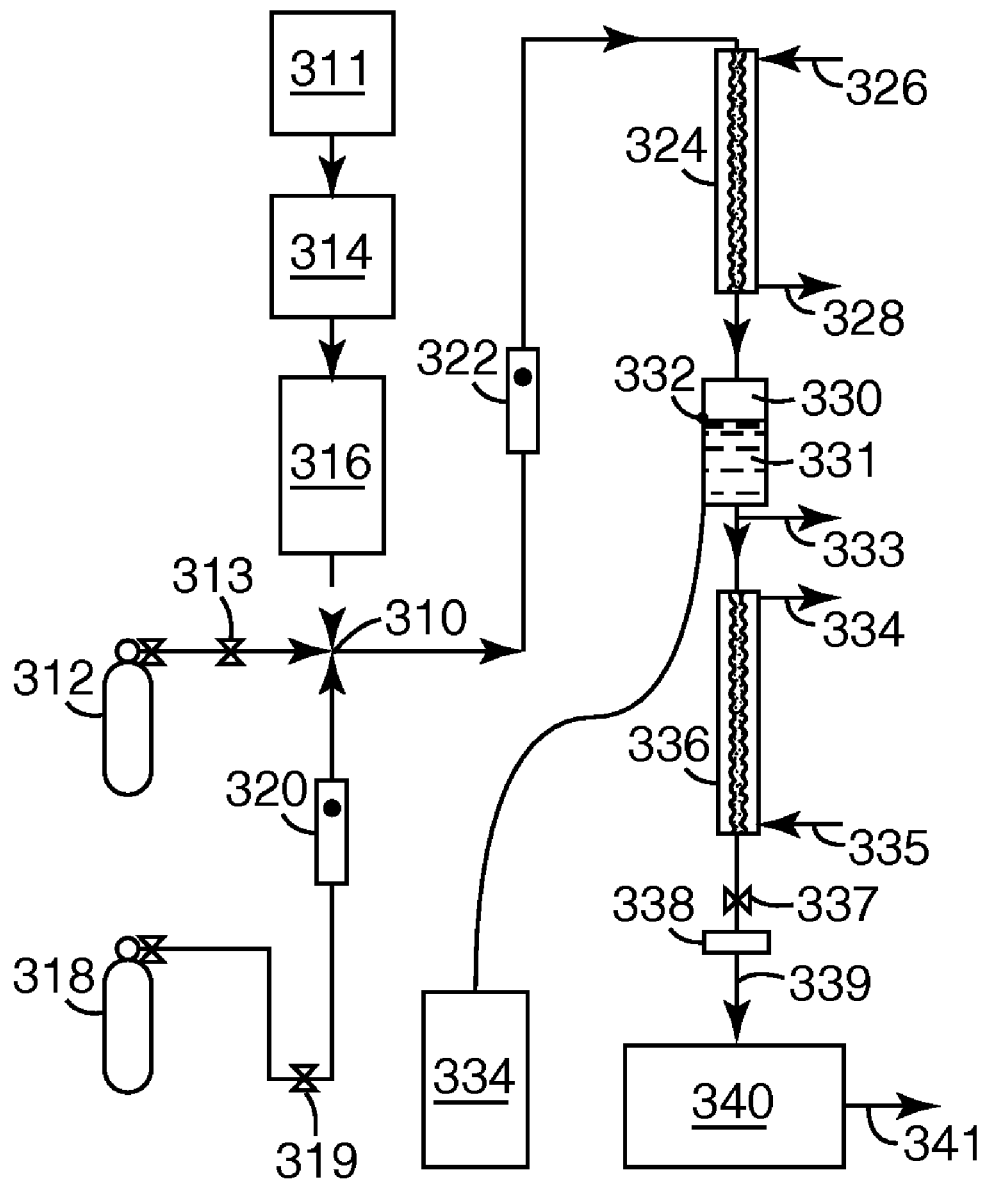

FIG. 4 schematically shows a test system used to test catalyst samples for the ability to oxidize CO and $H_2$ in a mixed $CO/H_2$ environment.

DETAILED DESCRIPTION

Titanium-Oxo/Zinc-Oxo Domains

Applicant discloses herein multifunctional, highly active oxidation catalysts and methods of making such catalysts. Such a catalyst is produced from nanoparticles that comprise titanium-oxo content and zinc-oxo content. As used herein, the term titanium-oxo denotes a titanium atom that is bonded to at least one oxygen atom, and includes titanium oxides (e.g. $TiO_2$). Similarly, the term zinc-oxo denotes a zinc atom that is bonded to at least one oxygen atom, and includes zinc oxides (e.g., ZnO). (The oxygen typically is at least in the $O^{2-}$, $OH^-$, and/or $H_2O$ form).

Specifically, such a catalyst is produced from nanoparticles that possess a multi-domain composite structure having at least titanium-oxo rich domains and zinc-oxo rich domains. In this context, multi-domain means that the particle surface exhibits two or more different domains that differ compositionally in their content of titanium-oxo versus zinc-oxo. For example, a first domain may include both titanium-oxo and zinc-oxo content, but be rich in titanium-oxo. A second domain may include titanium-oxo and zinc-oxo, but be rich in zinc-oxo. (In a specific embodiment, the titanium-oxo domains are substantially free of zinc-oxo content, and the zinc-oxo domains are substantially free of titanium-oxo content.)

Applicant notes further that the term "zinc-oxo domain" is used broadly herein to refer to any domain which is rich in zinc-oxo (e.g. which comprises at least about 50% zinc-oxo, as ascertained by a suitable measurement technique, e.g. X-Ray microanalysis) even though it may contain other materials as well. The term "titanium-oxo domain" is used in a similarly broad manner.

In various embodiments, such domains may have a longest dimension in the direction generally parallel to the particle surface (i.e., a length, or in the case of a roughly circular domain, a diameter) of less than about 10 nm, less than about 5 nm, or less than about 2 nm. In further embodiments, such domains may have a width of greater than about 0.5 nm, or greater than about 1.0 nm.

Such zinc-oxo domains and titanium-oxo domains as are present in the nanoparticles originally, and/or as remaining after the below-described etching process, may be identified and/or characterized using TEM analysis, XPS analysis, IR analysis, or other suitable techniques. One particularly suitable method for assessing multi-domain character is TEM (Transmission Electron Microscope) analysis as performed in the following exemplary manner. A sample (comprising nanoparticles) is dispersed into ethanol. A drop of the resulting dilute particle suspension is placed onto a lacey carbon/formvar support film supported by a standard 200 mesh, 3 mm diameter Cu grid. The sample is allowed to dry for a few minutes and is then placed into a TEM apparatus. Imaging is performed, for example, on a Hitachi H9000 transmission electron microscope operating at 300 kV, with images acquired digitally with a GATAN Ultrascan 894 CCD camera.

The particles mounted on a TEM grid as described above are examined at about 200-500 kx magnification. The stage is adjusted so as to allow clear viewing of a given individual nanoparticle and the stage is tilted to a zone axis to develop clear viewing of the particle lattice lines. The focus of the microscope is adjusted so as to provide sharp focus at different regions of the particle for a thorough examination. The examination should provide a clear, unobstructed view of the portion of the particle being viewed, with the portion not obscured by other particles or materials. Further, in the case of the examination of a particle edge, it is helpful if the edge does not overlay other particles that might make it more difficult to distinguish the features of the edge.

In analysis of a nanoparticle by such methods, different domains may be identified by the presence of aberrations or discontinuities in the lattice lines of the crystal structure of the materials comprising the nanoparticle, and/or by the presence of differences in the transparency of the oriented crystal to the electron beam which are observed in different locations. Further, energy dispersive, X-ray microanalysis may also be carried out on the specimens with very high spatial resolution in order to compositionally assess respective domains. By adjusting the resolution down to about the size of the dimensions of the domains, the elemental composition of a particular domain can be verified.

Domain boundaries may be present at the intersections of the domains. The domains may be physically or chemically bonded together at least at the domain boundaries. For example, in the case of titanium-oxo particles that are surface treated with zinc-oxo material to form a multi-domain composite having titanium-oxo domains and zinc-oxo domains, at least some of these domains may be chemically bonded to each other via oxide and hydroxide linkages, and/or physically bonded via van der Waals forces or the like. While not wishing to be bound by theory or mechanism, applicant postulates that such domain boundaries may be very finely dispersed at the nanoscale and thus may be effective in helping to immobilize nanosized catalytically active gold clusters which are deposited on the surface of the nanoparticles, as described later herein.

Nanoparticles as described herein may also comprise other components, for example silicon, silicon-oxo, iron, iron-oxo, cerium, cerium-oxo, aluminum, aluminum-oxo, and so on. Such components may be present in domains as described above (e.g., silicon-oxo may be present in silicon-oxo rich domains); or they may be present in amounts which are detectable but do not appear to form observable domains.

In addition to the above-described nanoparticles from which the catalyst is produced, other particles or nanoparticles (e.g. particles not containing titanium-oxo and/or zinc-oxo content) may of course also be present.

Deposition of Zinc-Oxo Domains

Multi-domain nanoparticles comprising at least titanium oxo domains, and zinc-oxo domains, can be provided by any suitable method. In one embodiment, such nanoparticles are formed by depositing zinc-oxo materials onto titanium-oxo rich nanoparticles. Suitable processes for these depositions may include 1) solution deposition, 2) chemical vapor deposition, or 3) physical vapor deposition.

Solution deposition involves reacting a dispersion of titanium-oxo rich nanoparticles with a precursor or precursors of the zinc-oxo domains so as to deposit and adhere the zinc-oxo domain precursor(s) on the surface of the nanoparticles to form zinc-oxo rich domains. Initial deposition can occur through simple adsorption of the zinc-oxo domain precursor on the surface, or through a chemical reaction that alters the zinc-oxo domain precursor resulting in bonding of the resultant zinc-oxo domain to the surface of the nanoparticle. This chemical reaction can involve hydrolysis, precipitation, complexation, etc., of the zinc in the zinc-oxo domain precursor, or a combination of these reactions.

In the case of hydrolysis, a metal salt or complex that is to form the zinc-oxo domain is reacted with water in such a manner as to form an amorphous oxide or hydroxide on the surface of the titanium-oxo nanoparticle. Examples of this method include the base-induced hydrolysis of acid soluble zinc cations (e.g., $Zn^{2+}$ cations formed by solubilizing a zinc compound such as zinc acetate, zinc chloride, zinc sulfate, zinc nitrate, etc. in a suitable acidic solution). Such base-induced hydrolysis can be carried out by simultaneous or sequential addition of a solution of the zinc complex or salt, and a base solution, to a dispersion of the titanium-oxo nanoparticles. In this case, the deposition of the zinc-oxo species occurs as a result of the base-induced formation of zinc hydroxide species. With proper control of reaction conditions, the zinc hydroxide species that are formed are of sufficiently low solubility under the conditions employed that they precipitate out on the surface of the nanoparticles. (The nanoparticle dispersion may be kept highly agitated during this addition so as to increase the uniformity of the deposition of the zinc-oxo domains on the nanoparticle surfaces).

Suitable bases for this process include water soluble compounds of alkali metals and alkaline earth metals; for example, sodium hydroxide, potassium hydroxide, sodium carbonate, sodium bicarbonate, barium hydroxide, etc. In general, the pH can be chosen to be in the range where the change in solubility of the zinc compound versus the change in pH is high. That is, rapid changes in the conditions of the deposition solution that result in rapid decreases in the solubility of the zinc-oxo precursors may desirably result in the deposition of the zinc-oxo material in domains of very small sizes (e.g., less than about 5 nm in longest dimension, or less than about 2 nm in longest dimension). Suitable pH for such an operation may range from, e.g., 6 to 11. Such processes can be carried out either at room temperature, at reduced temperatures or at elevated temperatures.

After deposition of the zinc-oxo rich domains on the titanium-oxo rich nanoparticles, the particles are optionally dried. In the case of deposition of the zinc oxo domains by hydrolysis techniques, the treated materials are also usually washed to remove the major portion of the byproducts of the hydrolysis reaction, prior to drying. In general the drying of the modified nanoparticles can be accomplished by heating at 60° C. to 250° C. in, e.g., a static or forced air furnace or a rotating oven, or by spray-drying or any other suitable drying technique. During drying, the modified nanoparticles can be in the form of a static bed or filter cake, a loose powder or a fluidized or agitated bed.

Suitable methods for the deposition of zinc-oxo rich domains onto titanium-oxo rich particles are further described in e.g., U.S. Pat. No. 5,624,667 to Maruo et al.

Etching Process

In one embodiment, the multifunctional catalyst disclosed herein is produced by providing nanoparticles at least some of which comprise a multi-domain composite structure having at least titanium-oxo domains and zinc-oxo domains, and exposing the nanoparticles to an etching process.

Without being limited by theory or mechanism, applicant postulates that performing such an etching process on a nanoparticle comprising titanium-oxo domains and zinc-oxo domains may have any or all of several possible effects that may result in the catalyst having improved multifunctional oxidation activity. For example, the structure and properties of the zinc-oxo domains may be altered; a portion of some zinc-oxo domains may be removed (thus making the domains smaller); some zinc-oxo domains may be completely removed; previously-inaccessible (titanium-oxo)-rich surfaces of the nanoparticle may be exposed; previously-inaccessible surfaces containing other components (e.g., silicon-oxo) may be exposed; and/or domain boundaries may be altered.

In one embodiment, at least a portion of the zinc-oxo domain material is removed in the etching process. In specific embodiment, zinc-oxo content is still detectable on the surface of the nanoparticle after the etching process. Such zinc-oxo content may be in the form of domains; or, detectable amounts of zinc-oxo may be present but not in the form of observable domains.

In an alternate embodiment the etching process is carried out such that no zinc-oxo content is detectable on the surface of the catalyst particles after etching. Without being limited by theory or mechanism, applicant postulates that the process of etching such that the zinc-oxo is removed, may have subtle effects such as those listed above, such that a nanoparticle having gone through such a process with the result that no zinc-oxo is detectable, may comprise unexpectedly high catalytic activity.

Such etching may be carried out by various methods. In one embodiment, a process is used that can preferentially remove zinc-oxo material, while removing relatively little titanium-oxo material. For example, an acidic etchant can be used that takes advantage of the fact that zinc is typically more readily etched and/or solubilized by an acidic reagent than is titanium. In a specific embodiment, the etching is performed by exposing the surface of the nanoparticles to nitric acid (e.g., aqueous nitric acid).

After etching, the nanoparticles may be washed or otherwise treated to remove the etchant and/or any materials liberated (dissolved, etc.) from the nanoparticles. In one embodiment the nanoparticles are washed with nonacidic (e.g., neutral or somewhat basic) water. (The washing process itself should of course not deposit any unwanted components on the nanoparticles).

In one embodiment, the etched and optionally washed nanoparticles are dried. Such drying can be achieved by, for example, heating the nanoparticles to about 60° C. to about 250° C. for a period of time of a few minutes to several hours in, e.g., a static or forced air furnace or a rotating oven, or by spray-drying or any other suitable drying technique.

In one embodiment, in addition to a drying step the nanoparticles are subjected to a calcining step, e.g., a high temperature treatment. Such a calcining step may for example involve heating the nanoparticles to about 250° C. to about 800° C. for a period of time of a few minutes to several hours.

Nanoparticles

Nanoparticles as described herein generally comprise particles with a (primary) particle size (as measured, for example, by any conventionally known method such as Transmission Electron Microscopy or TEM) of less than about 100 nm. In various embodiments, the nanoparticles comprise a mean particle size of at least about 3 nm. In other embodiments, the nanoparticles comprise a mean particle size of at most about 35 nm, at most about 15 nm, or at most about 8 nm.

In one embodiment, the nanoparticles are present in the form of aggregates of nanoparticles. In a particular embodiment, the aggregates comprise a mean particle size of about 0.1 µm to about 3 µm. Applicant notes that herein in this disclosure, when the term "nanoparticles" is used (such as in, for example, the description of properties of such nanoparticles, or the description of methods of processing of such nanoparticles), such use may refer either to the nanoparticles individually, or collectively in an aggregated form.

In various embodiments, such nanoparticles comprise a (BET) specific surface area (as can be determined by the procedure described in ISO 9277:1995) of at least about 40 m$^2$/g, at least about 150 m$^2$/g, or at least about 200 m$^2$/g. In additional embodiments, such aggregates of particles comprise a specific surface areas of at most about 1500 m$^2$/g, at most about 1000 m$^2$/g, or at most about 500 m$^2$/g.

In one embodiment, the nanoparticles and/or aggregates of nanoparticles comprise porosity. In a specific embodiment, the nanoparticles comprise a porosity (that is, the volume ratio of pore space to the total collective volume of the nanoparticles) greater than about 0.4. Such porosity may include contributions from such porosity as is present within each individual nanoparticle, and/or from such porosity as is provided in the interstitial spaces between nanoparticles when in an aggregated form. Such porosities can be observed and measured, for example via transmission electron microscopy (TEM).

In one embodiment, the nanoparticles and/or the aggregates of nanoparticles comprise nanoporosity. That is, they comprise the combination of a porosity greater than about 0.4, and an average pore diameter (as characterized by TEM) of about 1 nm to about 100 nm.

In a particular embodiment, the nanoparticles comprise a Nanoporous Capacity for pores in the size range of 1 to 10 nm that is greater than about 20 percent (that is, greater than about 0.20 using the formula below) of the total volume of pores in the size range of 1 to 100 nm, as calculated using the following formula:

$$NPC = \frac{CPv_1 - CPv_{10}}{CPv_1 - CPv_{100}}$$

wherein NPC refers to the Nanoporous Capacity of the nanoparticles; $CPv_n$ refers to the cumulative pore volume at pore radius n in cubic centimeters per gram (cm$^3$/g); and n is the pore radius in nanometers.

In a specific embodiment, the Nanoporous Capacity is calculated using data obtained by TEM. In an alternative embodiment, the data used is obtained by use of nitrogen desorption isotherms according to the technique described in ASTM Standard Practice D4641-94.

Applicant notes that the various methods of assessing particle size, porosity, nanoporosity, and Nanoporous Capacity described herein, can be performed at any stage of processing (that is, such parameters can be measured on nanoparticles as received, after etching, etc.).

In one embodiment, the nanoparticles comprise crystalline anatase titania. In a specific embodiment, the nanoparticles comprise a material comprising crystalline anatase titania nanoparticles with zinc-oxo domains, that is available under the designation ST-31 from Ishihara Sangyo Kaisha, Ltd., Osaka, Japan. This product has been reported by the manufacturer to have a $TiO_2$ content of 81 wt. %, an X-ray diameter of 7 nm (calculated by means of Scheller's equation), and a specific surface area of 250 $m^2/g$.

Guest/Host Structures

In one embodiment the nanoparticles are placed (e.g. deposited, adsorbed, adhered) on relatively larger host particles (such as larger particles, powders, pellets, granules, and combinations thereof), or on relatively larger nonparticulate host material (such as woven and nonwoven media, membranes, plates, filtration media arrays, and combinations thereof) to form a so-called guest-host structure. Such a guest/host structure can provide higher total exterior surface area while retaining the desirable gas flow characteristics, e.g., low pressure drop, of a larger particle.

If such a guest/host structure is used, the host can comprise porosity or nanoporosity, as herein defined (in addition to the above-described porous and/or nanoporous properties of the nanoparticles). The host can be made of any suitable material. In various embodiments the host comprises alumina, silica, titania, or activated carbon. In a particular embodiment, the host comprises the activated carbon available under the designation GG from Kuraray Chemical Co. Ltd., Osaka, Japan).

A variety of methods may be used to construct such a guest/host structure. In one embodiment, the nanoparticles are admixed with one or more adhesion agents in solution and then this mixture is combined with larger host particles. In another embodiment, guest-host composites are prepared by physically mixing nanoparticles with the host material. Adhesion agents may be used to adhere the nanoparticles (e.g., aggregates of nanoparticles) to the host material. Suitable adhesion agents may include partially hydrolyzed metal alkoxides, basic metal salts, and colloidal metal oxides and oxy-hydroxides. In various embodiments, the guest/host structure may be calcined or otherwise heat treated to more securely adhere the nanoparticles to the host material.

In the particular case of a guest/host structure, the above-described zinc oxo deposition process and/or the zinc-oxo removal process can be carried out on the nanoparticles prior to the nanoparticles being deposited onto the host. Alternatively, either or both of these processes may be carried out after the guest/host structure is formed.

Gold Deposition

In one embodiment, the nanoparticles comprise catalytically active gold. In this context, catalytically active gold signifies gold particles (e.g., clusters) of about 0.5 nm to about 50 nm in size. In various embodiments, such gold clusters comprise an average size of less than about 5 nm in longest dimension, or of less than about 2.5 nm in longest dimension. In various additional embodiments, the gold is deposited such that less than about 20 weight percent of the deposited gold consists of gold particles greater than about 3 nm in size, such that less than about 10 weight percent of the gold consists of gold particles greater than about 3 nm in size, or such that less than about 5 weight percent of the gold consists of gold particles greater than about 3 nm in size.

Catalytically active gold of the above particle size can be deposited on the nanoparticles in a variety of methods including so-called wet methods (including solution-deposition and the like), and chemical vapor deposition. In a particular embodiment, the gold is deposited by physical vapor deposition (PVD), for example, by specific methods described later herein. In various embodiments, PVD is carried out under temperature and vacuum conditions in which the catalytically active gold is sufficiently mobile and/or while the nanoparticles are being well mixed (for example, by tumbling, fluidizing, or the like). Representative approaches for PVD include evaporation, sputter deposition, and cathode arc deposition.

Without being limited by theory or mechanism, applicant postulates that after being deposited by physical vapor deposition, the catalytically active gold becomes relatively immobilized on the nanoparticle surface by adhering to sites, such as, for example, defects, structural discontinuities, interfacial boundaries, domain boundaries, and the like. As a result, the catalytically active gold is typically relatively highly catalytically active without heat treatment, though such treatment may be practiced if desired. The catalytically active gold can remain very active for relatively long periods and over a wide temperature range, including room temperature (e.g., about 22° C. to about 27° C.) and much cooler (e.g., less than about 5° C.), even in humid environments.

This high activity can be obtained at a relatively low level of catalytically active gold. For example, about 0.005 wt % to about 5 wt % of catalytically active gold (based on the total weight of the nanoparticles) can provide high catalytic performance. In various embodiments, the catalytically active gold is present at a weight percentage of about 0.005% to about 2%, or about 0.005% to about 1.5%. In one embodiment, the catalytically active gold is deposited at a temperature below about 150° C.; in further embodiments the gold is deposited at an ambient temperature of about 20° C. to about 27° C. or lower.

In various embodiments, additional catalytically active metals, such as, for example, silver, palladium, platinum, rhodium, ruthenium, osmium, copper, iridium, and combinations thereof, may be deposited simultaneously or sequentially with catalytically active gold, to supply additional catalytic functionality.

In the particular embodiment in which the catalyst system comprises a guest/host structure, the gold can be deposited onto the nanoparticles after which the nanoparticles are deposited on the host. In an alternative embodiment, the nanoparticles can be deposited onto the host after which the gold is deposited. In various embodiments, the gold may be present on the host as well as on the nanoparticles.

Other Components

Such catalyst systems as described herein (e.g., aggregates of nanoparticles, or guest/host constructs comprising nanoparticles upon a host material) can comprise various other components as desired. For example, so-called activating agents can be present, either on the nanoparticles, the host material, or both. As used herein, an activating agent generally refers to any ingredient that is generally not catalytic by itself yet can enhance the performance of a catalyst when both the activating agent(s) and the catalyst are incorporated into the system. In various embodiments, activating agents include water soluble metal salts such as salts of the alkali or alkaline earth metals such as lithium, potassium, sodium, magnesium, calcium, and/or barium. Combinations of any of these metal salts may be used. In various embodiments, the catalyst system may include about 0.25 to about 15 weight percent of activating agent(s) based upon the total weight of the activating agent(s) and the catalyst system. In the case of a guest/host catalyst system, the activating agent may be incorporated (e.g., impregnated) onto or into the nanoparticles, the host material, or both. Certain host materials may also be chosen that inherently contain some amount of activating agent. For example, the previously-mentioned GG activated carbon is believed to contain potassium carbonate.

In certain embodiments the activating agent may be heat treated (calcined) for optimum performance. Such calcining may be performed, for example, at a temperature in the range of about 125° C. to about 1000° C. for a time period in the range of about 1 second to about 40 hours, preferably about 1 minute to about 6 hours, in any suitable atmosphere, such as, for example, air; an inert atmosphere such as nitrogen, carbon dioxide, and argon; a reducing atmosphere such as hydrogen; or the like.

Such catalyst systems can also contain so-called filtering agents. A filtering agent generally refers to any ingredient that may help to filter one or more undesired gases from an air stream if incorporated into a catalyst system. Representative examples of suitable filtering agents include metals, metal alloys, intermetallic compositions, compounds containing one or more of copper, zinc, molybdenum, silver, nickel, vanadium, tungsten, yttrium, and cobalt, and combinations thereof. Cu may help to filter HCN, $H_2S$, and acid gases; Zn may help to filter HCN, cyanogen chloride, cyanogen, and $NH_3$; Ag may help to filter arsenical gases; and Ni and Co each independently may help to filter HCN.

In various embodiments, the catalyst system may include about 0.1 to about 20 weight percent of filtering agent(s) based upon the total weight of the filtering agent(s) and the catalyst system. In the case of a guest/host catalyst system, the filtering agent may be incorporated (e.g., impregnated) onto or into the nanoparticles, the host material, or both.

Applicant notes that other particles and/or nanoparticles may be present in the catalyst system along with the above-described etched nanoparticles, for a wide variety of reasons.

The catalysts or catalyst systems disclosed herein may be used in a wide variety of filter media, such as, for example, those described in U.S. Pat. No. 6,752,889 (the entirety of which is incorporated herein by reference), which generally include a plurality of open pathways, or flow channels, extending from one side of the media to the other.

EXAMPLES

The operation of the present invention will be further described with regard to the following examples. These examples are offered to further illustrate the various specific embodiments and techniques. It should be understood, however, that many variations and modifications may be made while remaining within the scope of the present invention.

Figure 1:
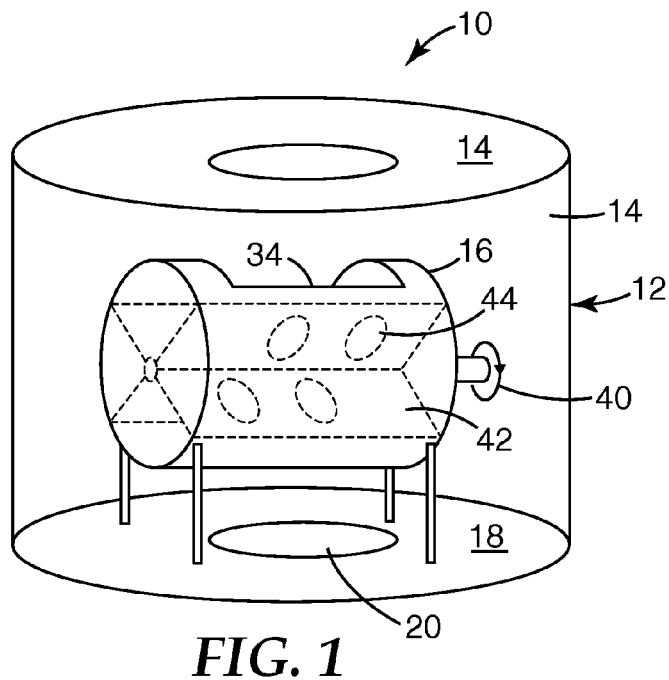
FIG. 1 is a schematic perspective view of an apparatus for carrying out a PVD process for depositing catalytically active gold.
Figure 2:
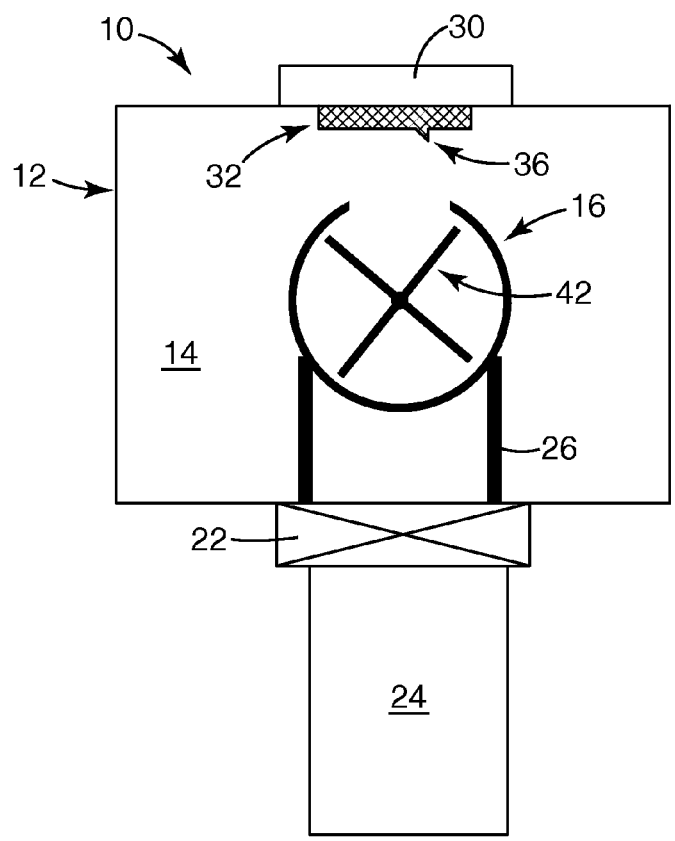
FIG. 2 is a schematic side view of the apparatus of FIG. 1.

Gold Application Method: Process for Deposition of Gold Nanoparticles onto Substrate Particles An apparatus 10 for depositing catalytically active gold using PVD techniques is shown in FIGS. 1 and 2. The apparatus 10 includes a housing 12 defining a vacuum chamber 14 containing a particle agitator 16. The housing 12, which may be made from an aluminum alloy if desired, is a vertically oriented hollow cylinder (45 cm high and 50 cm in diameter). The base 18 contains a port 20 for a high vacuum gate valve 22 followed by a six-inch diffusion pump 24 as well as a support 26 for the particle agitator 16. The chamber 14 is capable of being evacuated to background pressures in the range of $10^{-6}$ torr.

The top of the housing 12 includes a demountable, rubber L-gasket sealed plate 28 that is fitted with an external mount three-inch diameter dc magnetron sputter deposition source 30 (a US Gun II, US, INC., San Jose, Calif.). Into the source 30 is fastened a gold sputter target 32 (7.6 cm (3.0 inch) diameter×0.48 cm (3/16 inch) thick). The sputter source 30 is powered by an MDX-10 Magnetron Drive (Advanced Energy Industries, Inc, Fort Collins, Colo.) fitted with an arc suppressing Sparc-le 20 (Advanced Energy Industries, Inc, Fort Collins, Colo.).

The particle agitator 16 is a hollow cylinder (12 cm long× 9.5 cm diameter horizontal) with a rectangular opening 34 (6.5 cm×7.5 cm) in the top 36. The opening 34 is positioned 7 cm directly below the surface 36 of the gold sputter target 32 so that sputtered gold atoms can enter the agitator volume 38. The agitator 16 is fitted with a shaft 40 aligned with its axis. The shaft 40 has a rectangular cross section (1 cm×1 cm) to which are bolted four rectangular blades 42 which form an agitation mechanism or paddle wheel for the particles being tumbled. The blades 42 each contain two holes 44 (2 cm diameter) to promote communication between the particle volumes contained in each of the four quadrants formed by the blades 42 and agitator cylinder 16. The dimensions of the blades 42 are selected to give side and end gap distances of either 2.7 mm or 1.7 mm with the agitator walls 48.

This apparatus is used as follows to prepare catalytic materials according to the following procedure. 300 cc of substrate particles are first heated to about 150° C. in air overnight to remove residual water. They are then placed into the particle agitator apparatus 10 while hot, and the chamber 14 is then evacuated. Once the chamber pressure is in the $10^{-5}$ torr range (base pressure), the argon sputtering gas is admitted to the chamber 14 at a pressure of about 10 millitorr. The gold deposition process is then started by applying a pre-set power to the cathode. The particle agitator shaft 40 is rotated at about 4 rpm during the gold deposition process. The power is stopped after the pre-set time. The chamber 14 is backfilled with air and the gold coated particles are removed from the apparatus 10. The gold sputter target 32 is weighed before and after coating to determine the amount of gold deposited. In general, about 20% of the weight loss of the target represents gold deposited on the sample.

During the deposition process the gap between the blades 42 and the chamber wall was set to a pre-set value of 2.7 mm. The sputter power is 0.12 kW and the deposition time is 2 hours for working example 1 and 1 hour for working example 2.

Test Procedure 1: Test for CO Oxidation Activity

A test system 250 used to quickly screen small quantities of new catalyst formulations for activity is shown in FIG. 3. A 3600 ppm CO/air mixture flows into box 280 via line 285 typically at 64 L/min and >90% RH. 9.6 L/min of this flow is pulled through a tube 289 containing the catalyst sample 290 while the excess is vented outside the box 280 via vent (not shown) on the side of box 280.

A 5 mL sample of catalyst is prepared by loading it into a 10 mL graduated cylinder using the method described in ASTM D2854-96 Standard Method for Apparent Density of Activated Carbon. Using the same method, the catalyst sample 290 is loaded into tube 289 (a 5/8 inch ID (3/4 inch OD) copper tube about 8.9 cm (3.5 inches) in length sealed at one end by a cotton plug (not shown).

The tube 289 containing the catalyst sample 290 is introduced up through the 29/42 inner fitting at the bottom of the polycarbonate box 287 so that the open end extends into the box. The other end of the tube is equipped with a 3/4 inch Swagelok® nut and ferrule (not shown) for easy connection and disconnection to/from the test system 250. The nut engages a female fitting (not shown) in a 1/2 inch OD tube 295 connected via a branch 296 to a vacuum source (not shown) through a rotameter 293 and needle valve 294. The tube 295 also connects to the inlet of the diaphragm pump (not shown)

via branch 297 which draws sample to the sampling valve of a gas chromatography instrument and CO detector used as CO detection system 284. The small flow to the gas chromatography instrument (approximately 50 mL/min) is negligible in comparison to the total flow through the catalyst bed. The rotameter 293 is calibrated by placing a Gilibrator soap bubble flow meter (not shown) at the entrance to the copper tube containing the catalyst.

To start the test, a steady 64 L/min flow of a 3600 ppm CO/air mixture at >90% RH is introduced into the polycarbonate box 280. The needle valve 294 is then adjusted to give a flow of 9.6 L/min through the catalyst sample 290. The CO concentration in the air exiting the catalyst sample 290 is analyzed by the CO detection system 284. The results are processed via computer 286. CO detector system 284 includes an SRI 8610C gas chromatograph (SRI Instruments, Torrance, CA) equipped with a 10 port gas sampling valve. A diaphragm pump (KNF Neuberger UNMP830 KNI, Trenton, N.J.) continuously draws approximately 50 mL/min of sample from the test outlet through the gas sampling valve of the GC. Periodically the valve injects a sample onto a 0.91 m (3 ft) 13X molecular sieve column. The CO is separated from air and its concentration is measured by a methanizer/FID detector (minimum detectable CO concentration less than 1 ppm). The GC is calibrated using certified standard CO in air or nitrogen mixtures in the range from 100 to 5000 ppm CO (Quality Standards, Pasadena, Tex.). After completion of the analysis, another sample is injected onto the column and the analysis repeated.

Using this method, the CO concentration (in ppm) in the outlet stream is measured, and the associated CO conversion (in %) achieved by the catalyst is calculated therefrom. These measurements/calculations are repeated periodically over a period of time from about 4 minutes after the onset of CO exposure of the sample to about 30 minutes after the onset of CO exposure of the sample. The average CO concentration in the outlet stream, and the average CO conversion achieved by the catalyst, over this period are then reported.

Test Procedure 2: Test for Multifunctional Catalytic Activity

The system used to test catalyst samples for multifunctional catalytic activity (oxidation of both CO and $H_2$) is shown in FIG. 4. A stoichiometric excess of oxygen (humidified air at 60 mL/min; $\lambda=4$ (i.e., a stoichiometric oxygen excess ratio of 4)) is mixed with a humidified gas mixture of 300 mL/min 2% CO in hydrogen and passed through a catalyst bed at room temperature. In performing this test, the temperature of the catalyst bed increases proportionally to the amount of energy released during the oxidation reactions. If the oxidation reaction involves only CO, the temperature rise is that which would be expected for the heat of reaction for the complete oxidation of the CO. If, in the course of the test, the catalyst oxidizes not only CO but also hydrogen, the temperature will rise an additional amount, in proportion to the amount of hydrogen that is oxidized. Thus, by measuring both the amount of carbon monoxide that is not oxidized in the test, and the temperature of the catalyst bed, the multifunctional catalytic activity of the material can be ascertained. Specifically, when this test is performed using the equivalent amount of pure CO (6 mL/min) in helium at a $\lambda$ value of 4 and a total flow of 360 mL/min, the steady-state temperature measured by the thermocouple reader is typically about 40° C. Such temperature corresponds to complete oxidation of CO alone (that is, in the absence of any oxidation of hydrogen). Thus, under typical test conditions, a test bed temperature higher than about 40° C. indicates that the catalyst is oxidizing $H_2$ (in addition to CO).

In order to further evaluate the catalyst properties, at about 35 minutes after the start of the test, humidified $CO_2$ at 150 mL/min is added to the feed in order to evaluate the effect of $CO_2$ on the ability of the catalyst to oxidize CO and/or $H_2$.

In summary, the combination of a high CO conversion (indicated by a low concentration of CO in the output gaseous stream) and a high $H_2$ conversion (indicated by a temperature increase of the test bed) may be indicative of relatively high multifunctional activity of the sample catalyst. Relatively high multifunctional activity may also be indicated if the ability of the catalyst to catalyze the oxidation of both CO and $H_2$ is still relatively high even in the presence of $CO_2$.

The test is described in further detail as follows. The gas mixture used in this test procedure is made by combining three different gas flows in a Swagelok® ⅛ inch stainless union cross fitting 310 (Swagelok Company, Solon, Ohio, part number SS-200-4). Each gas flow can be separately connected and disconnected from the fitting. Plugs are used to close off unused ports.

The three gases used to create the test mixture are as follows: (1) A high pressure mixture of 2% (v/v) CO in hydrogen (Quality Standards, Pasadena, Tex.) stored in tank 312 equipped with a pressure regulator and fine needle valve 313 (Whitey SS-21RS2); (2) Building compressed air 311—the air is filtered and regulated by a 3M W-2806 compressed air filter regulator panel 314 and metered into the test system by a mass flow controller 316 (Sierra Instruments model 810C-DR-13, Monterey, Calif.); (3) A tank 318 of industrial grade $CO_2$ equipped with a pressure regulator and fine needle valve 319 (Whitey SS-21RS2, Swagelok Company, Solon, Ohio). The $CO_2$ flow passes through a rotameter 320 (Alphagaz 3502 flowtube, Air Liquide, Morrisville, Pa.) before entering the union cross fitting 310.

The above gases mix in the union cross fitting 310 and pass through rotameter 322 (Aalborg Instruments 112-02 flowtube, Orangeburg, N.Y.). This rotameter measures the total flow of the gas mixture used in the test procedure.

The gas mixture is then humidified to >90% RH at room temperature (~2.7% water vapor) by passing it through the inner tube of a tube-in-shell Nafion® humidifier 324 as shown (Perma Pure MH-050-12P-2, Toms River, N.J.). Liquid water is introduced to the humidifier through line 326 and exits via line 328.

The humidified gas mixture then passes into a 0.5 inch OD/0.42 inch ID stainless tube 330 about 3 inches in length that contains the catalyst sample 331 to be tested. The tube is equipped with Swagelok® reducing union compression fittings (½ inch to ¼ inch; not shown) for easy attachment to/removal from the test system. The catalyst is held in the tube on a layer of glass wool supported on the bottom reducing union fitting. A type K thermocouple 332 is attached to the outside of the tube with 3M type 5413 polyimide film tape (3M Company, St. Paul, Minn.) at the position corresponding to the top of the catalyst bed. The thermocouple is kept from direct contact with the metal surface of the tube by a layer of the tape. A thermocouple reader 334 (model HH509R, Omega Engineering, Stamford, Conn.) is used to read the temperature of the thermocouple junction.

After exiting the catalyst bed, most of the gas flow is vented into a fume hood through vent 333, but about 50 mL/min is dried by passing through a tube in shell Nafion® dryer 336 (Perma Pure MD-050-12P, Toms River, N.J.) and passed to a GC for measurement of CO concentration. The dryer removes the large quantities of water that result in the case of significant $H_2$ oxidation by the catalyst sample. This water would otherwise condense in the transfer lines and could enter the gas sampling valve of the GC. A stream of dry nitrogen flows through the dryer shell to carry away this water ($N_2$ inlet 335; $N_2$ outlet 334). A UNMP830 KNI diaphragm pump 338 (KNF Neuberger, Trenton, N.J.) is used to transfer the dried gas stream 339 to the GC gas sampling valve (not shown). The flow is regulated by a stainless steel metering valve 337 (part number SS-SS2, Swagelok Company, Solon, Ohio). The stream 339 passes through the gas sampling valve and exits the GC as stream 341.

The CO content of the gas stream is determined by gas chromatography using a SRI 8610C gas chromatograph 340 (SRI Instruments, Torrance, Calif.) equipped with a 10 port gas sampling valve and methanizer/hydrogen flame ionization and helium ionization (HID) detectors. Periodically the gas sampling valve injects a 0.5 mL sample from stream 339 onto a 5 ft×⅛ inch silica gel column at 125° C. This column is located in the main oven compartment of the GC. $CO_2$ and water vapor are held up on the silica gel column while the other components (CO, $O_2$, $N_2$, and $H_2$) pass through to a 3 ft×⅛ inch molecular sieve 5A column at 125° C. located in the valve oven compartment of the GC. This column separates these components and the gas stream passes through to the methanizer/FID. Hydrogen is added to the gas stream before it enters the methanizer.

The 380° C. nickel catalyst in the methanizer converts CO to $CH_4$ which is detected by the FID. CO levels down to about 0.2-0.5 ppm can be measured. After the CO is eluted, the gas sampling valve switches (at 4 minutes into the run) and reverses the orientation of the two columns with respect to the detector (flow direction through the columns remains unchanged). Effluent from the silica gel column now passes directly into the detector. The temperature of the silica gel column is ramped to 215° C. until the $CO_2$ and water vapor elute. $CO_2$ is also converted into methane by the methanizer and detected by the FID. (Under certain conditions in these experiments, $CO_2$ levels are so high that the detector electronics saturate before all of the $CO_2$ peak elutes). Under typical test conditions, a single measurement requires about 9.25 minutes. The gas sampling valve switches back and the process then repeats for the next sample. An additional 2 minutes is required to lower the main oven temperature back down to 125° C. in preparation for the next run.

The two column arrangement described above ensures that $CO_2$ never enters the molecular sieve column. This is necessary to prevent rapid saturation of the column in the event of very high $CO_2$ concentrations in this test (subsequent leakage of $CO_2$ out of the column into the methanizer would make low level CO measurements impossible).

The methanizer/flame ionization detector was used in this test since it is selective to CO and $CO_2$, extremely sensitive (detection limits <1 ppm), stable, and exhibits a linear response from ~1 ppm to >7000 ppm CO (amplifier saturation). The GC is calibrated using CO in air or nitrogen mixtures in the range from 50 to 6500 ppm (Quality Standards, Pasadena, Tex.).

The mass flow controller for air 316, the $CO_2$ rotameter 320, and rotameter 322 for the CO/$H_2$ mixture are calibrated in lab ambient mL/min for each gas using a Gilibrator® bubble flow meter (Sensidyne, Clearwater, Fla.) (not shown) placed at the position of the catalyst bed. (Under typical test conditions, for example, the gases may contain about 2.7% (v/v) water vapor).

Catalyst samples are sieved to remove particles finer than 25 mesh using ASTM E11 U.S. Standard Sieves prior to testing. A 5 mL catalyst sample is measured out in a 10 mL graduated cylinder using the method described in ASTM D2854-96 Standard Method for Apparent Density of Activated Carbon. The 5 mL sample is then loaded into the ½ inch OD catalyst holder 330 using the same method. Catalyst mass is typically about 2 grams.

The catalyst holder 330 is mounted in the test system and $CO_2$ is passed through the test apparatus for about a minute. This prevents the formation of a possibly explosive mixture in the catalyst bed when the CO/$H_2$ flow is started. The temperature indicated by the thermocouple reader 334 rises several degrees during this procedure as the water vapor/$CO_2$ mixture is adsorbed on the dry activated carbon catalyst support.

300 mL/min of humidified 2% CO in $H_2$ is now passed through the catalyst bed. The $CO_2$ flow is disconnected from the union cross fitting 310 and the port is plugged. Humidified air at 60 mL/min is now added. The oxygen content of humid air is assumed to be 20.4%. The feed to the catalyst is 1.63% CO, 79.8% $H_2$, 3.32% $O_2$, 12.9% $N_2$, and 2.7% $H_2O$ at a flow rate of 360 mL/min. The ratio of $O_2$ to CO is 2 which corresponds to a λ value of 4.

After about 1 minute, the GC 340 is started and the first gas sample injected for analysis. The temperature displayed by the thermocouple reader 334 is recorded as is the CO concentration measured by the GC 340. This is repeated every 11.25 minutes as a new sample is injected for analysis.

After about 35 minutes, humidified $CO_2$ at 150 mL/min is added to the feed. The test is then continued for approximately another 30 minutes, to observe the effect of $CO_2$ on the activity of the catalyst. After addition of $CO_2$, the feed is 1.15% CO, 56.3% $H_2$, 2.35% $O_2$, 9.1% $N_2$, 28.7% $CO_2$, and 2.7% $H_2O$ at a flow rate of 510 mL/min. λ remains at 4.

Test Procedure 3: Test for $H_2$ Oxidation Activity

The purpose of this test is to evaluate catalysts for activity in hydrogen oxidation with no CO present.

This test procedure uses the same basic test system shown in FIG. 4 with certain alterations. The cylinder of 2% CO in hydrogen is replaced with a cylinder of ultrahigh purity hydrogen and an in-line Gilibrator® soap bubble flowmeter is used to measure $H_2$ flow instead of the rotameter 322 shown in FIG. 3. The GC detector is switched from the methanizer/FID to the HID and the temperature of the molecular sieve 5A column lowered to 65° C.

The HID is a universal detector so it can detect $H_2$, $O_2$, $N_2$, and $H_2O$ as well as CO and $CO_2$. A large excess of hydrogen over oxygen is used in this test so the difference in $H_2$ concentration before and after the catalyst is small. It is more practical to measure the change in $O_2$ concentration and use the % conversion of $O_2$ ($X_{O2}$), as calculated using the following equation, as a representation of the $H_2$ oxidation activity of the catalyst:

$$X_{O2} = \frac{[O_2]_{in} - [O_2]_{out}}{[O_2]_{in}} \times 100$$

A higher measured oxygen conversion ($X_{O2}$) is thus indicative of a higher ability of the catalyst sample to catalyze the oxidation of $H_2$.

The HID is calibrated for oxygen by mixing metered flows of air and hydrogen in the test system to give oxygen concentrations in the range 0.2 to 1.4% by volume. The oxygen content of humid air is assumed to be 20.4%.

Humidified hydrogen at 420 mL/min is mixed with humidified air at 30 mL/min and passed through the catalyst bed at room temperature. The composition of the feed is 91% $H_2$, 1.3% $O_2$, 5.2% $N_2$, and 2.7% $H_2O$ at 450 mL/min. $CO_2$ is passed through the system before starting the $H_2$ flow just as in test procedure 2.

After about 1 minute, the GC 340 is started and the first gas sample injected for analysis. The $O_2$ concentration measured by the GC 340 is recorded. This is repeated every 4.25 minutes as a new sample is injected for analysis.

Working Example 1

ST-31 titania (Ishihara Sangyo Kaisha, Ltd., Osaka, Japan) was etched using dilute nitric acid according to the following procedure. ST-31 (30 g, believed to comprise approximately 0.300 mol $TiO_2$ and 0.074 mol ZnO) was weighed into a glass beaker equipped with magnetic stirring. 0.1 M $HNO_3$ (815 g, J T Baker, Phillipsburg, N.J.) was added to the beaker to 1.1 molar equivalents versus ZnO. Medium speed stirring was allowed to occur for 16 hours at ambient temperature. The etched ST-31 was split into two portions and vacuum filtered through a fitted funnel (D porosity). Each portion was rinsed six times with deionized water, approximately 150 ml per rinse. The combined sample was dried at 110° C. for two hours in an aluminum pan.

158 g of 12×20 Kuraray GG carbon (Kuraray Chemical Company, Ltd., Osaka, Japan) was placed into an aluminum pan (7.6 cm×10.1 cm×3.8 cm). 21.6 g of the etched ST-31 titania was weighed into a 250 mL beaker. 221 g of deionized water were added and the contents of the beaker were then mixed using a Turrax T18 mixer (IKA-Werke GmbH & Co., Staufen, Del.) at setting 3 for 4 minutes. The titania dispersion was then pumped through a finger actuated spray nozzle (a common household plastic spray bottle) onto the carbon. The bed of carbon particles was turned using a spatula after every two sprays to ensure a uniform coating of the dispersion on the carbon particles.

The pan and treated carbon were placed into an oven set to 110° C. for 2 hours. An additional 100 g of deionized water was sprayed onto the slightly dried coated carbon while stirring the carbon particles with a tongue depressor every several sprays to homogenize the coating. Final drying was achieved by drying for 2 more hours at 110° C.

The titania on carbon sample was then coated with gold using the gold application method described above. Sample weight, base pressure, and gold target weight loss are given in Table 1.

TABLE 1

| Sample Weight (g) | Base Pressure (Torr) | Gold Target Weight Loss (g) |
|---|---|---|
| 124.79 | 0.000082 | 3.42 |

After gold treatment, the sample was tested as a CO oxidation catalyst according to test procedure 1 described above. The results of this test are included in Table 2.

TABLE 2

| Average CO Conversion (%) | Average CO Concentration (ppm) |
|---|---|
| 98.6 | 50.3 |

The gold-coated sample was also tested according to test procedure 2 described above. Results of the testing are included in Table 3. The minimum sampling time before $CO_2$ addition was 38 minutes. The minimum sampling time following $CO_2$ addition was 28 minutes.

TABLE 3

| Before $CO_2$ Addition | | | | After $CO_2$ Addition | | | |
|---|---|---|---|---|---|---|---|
| $CO_{avg}$ (ppm) | $T_{avg}$ (° C.) | $CO_{max}$ (ppm) | $T_{max}$ (° C.) | $CO_{avg}$ (ppm) | $T_{avg}$ (° C.) | $CO_{max}$ (ppm) | $T_{max}$ (° C.) |
| 92.9 | 62.8 | 136 | 73 | 110 | 74.6 | 126 | 76 |

Further, the gold-coated sample was tested according to test procedure 3 described above. The oxygen conversion versus time is given in Table 4.

TABLE 4

| Time (minutes) | Oxygen Conversion (%) |
|---|---|
| 1 | 25.8 |
| 5.25 | 21.8 |
| 9.5 | 19.9 |
| 13.75 | 18.7 |
| 18 | 18.1 |
| 22.25 | 18.2 |

COMPARATIVE EXAMPLE 1

201.43 g of 12×20 mesh Kuraray GG carbon was placed in a 1-gallon metal paint can. 22.61 g of ST-31 titania was weighed into a 250 mL beaker. 160.41 g of deionized water were added and the contents of the beaker were then mixed using a Turrax T18 mixer at setting 3 for 4 minutes. The can was then placed on motorized rollers (Bodine Electric Company of Chicago, Ill.), raised to a 45° angle, and rotated at 24 rpm. The ST-31 titania dispersion was then pumped through a finger-actuated spray nozzle (a common household plastic spray bottle) onto the carbon until half of the dispersion was gone at which time the carbon was dried gently with a heat gun until the carbon appeared to be loose and dry. The spraying then continued until all of the dispersion was sprayed onto the GG. The carbon was then dried with the heat gun for 3 minutes and then placed into an aluminum pan. The pan and carbon were placed into an oven set to 120° C. for 16 hours.

The titania on carbon sample was then coated with gold using the gold application method described above. Sample weight, base pressure, and gold target weight loss are given in Table 5.

TABLE 5

| Sample Weight (g) | Base Pressure (Torr) | Gold Target Weight Loss (g) |
|---|---|---|
| 137.51 | 0.000092 | 6.9 |

After gold treatment, the sample was tested as a CO oxidation catalyst according to test procedure 1 described above. The results of this test are included in Table 6.

TABLE 6

| Average CO Conversion (%) | Average CO Concentration (ppm) |
|---|---|
| 99.6 | 14.9 |

The gold-coated sample was also tested according to test procedure 2 described above. Results of the testing are included in Table 7. The minimum sampling time before $CO_2$ addition was 38 minutes. The minimum sampling time following $CO_2$ addition was 28 minutes.

TABLE 7

| Before CO$_2$ Addition | | | | After CO$_2$ Addition | | | |
|---|---|---|---|---|---|---|---|
| CO$_{avg}$ (ppm) | T$_{avg}$ (° C.) | CO$_{max}$ (ppm) | T$_{max}$ (° C.) | CO$_{avg}$ (ppm) | T$_{avg}$ (° C.) | CO$_{max}$ (ppm) | T$_{max}$ (° C.) |
| <0.5 | 38.6 | <0.5 | 41 | <0.5 | 39 | <0.5 | 39 |

Further, the gold-coated sample was tested according to test procedure 3 described above. The oxygen conversion versus time for each is given in Table 8.

TABLE 8

| Time (minutes) | Oxygen Conversion (%) |
|---|---|
| 1 | 5.15 |
| 5.25 | 5.44 |
| 9.5 | 5.79 |
| 13.75 | 5.08 |
| 18 | 5.81 |

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

The invention claimed is:

1. A method of making a catalyst, comprising the steps of: providing a plurality of crystalline anatase titania nanoparticles,
    wherein at least some of the nanoparticles possess a multi-domain composite structure comprising at least zinc-oxo domains and titanium-oxo domains;
etching the nanoparticles with an acidic etchant so as to remove at least a portion of the zinc-oxo domains from at least some of the nanoparticles; and, depositing gold clusters of dimensions of about 0.5 nm to about 50 nm onto the etched nanoparticles.

2. The method of claim 1, wherein the etching process preferentially removes zinc-oxo material in comparison to titanium-oxo material.

3. The method of claim 2, wherein the etchant comprises nitric acid.

4. The method of claim 1, further comprising the step of drying the etched nanoparticles.

5. The method of claim 1, wherein the gold clusters are deposited via physical vapor deposition.

6. The method of claim 1, wherein the nanoparticles comprise crystalline anatase titania nanoparticles having zinc-oxo domains on their surfaces and having a TiO2 content of about 81% and a specific surface area of about 250 m2/g 7. The method of claim 1, further comprising the step of depositing the etched nanoparticles on a host material so as to form a catalyst system comprising a guest/host structure.

8. The method of claim 7, further comprising the step of incorporating the catalyst system with at least one activating agent.

9. The method of claim 7, further comprising the step of incorporating the catalyst system with at least one filtering agent.

10. The method of claim 7, wherein the host material comprises activated carbon.

11. The method of claim 1 wherein the etched nanoparticles have a mean particle size in the range of about 3 nm to about 15 nm.

12. The method of claim 1 wherein the etched nanoparticles comprise nanoporosity.

13. The method of claim 1 wherein the etched nanoparticles are present as aggregates having a mean particle size in the range of about 0.1 μm to about 3 μm.

14. The method of claim 13 wherein the aggregates comprise nanoporosity.

\* \* \* \* \*

UNITED STATES PATENT AND TRADEMARK OFFICE
CERTIFICATE OF CORRECTION

PATENT NO. : 8,236,725 B2
APPLICATION NO. : 12/997396
DATED : August 7, 2012
INVENTOR(S) : Duane D Fansler Page 1 of 2

It is certified that error appears in the above-identified patent and that said Letters Patent is hereby corrected as shown below:

Title Page 2, Column 2, Item (56) (Other Publications)
Line 6, Delete ""Au/MxOy/Ti02" and insert -- "Au/MxOy/TiO2 --, therefor.

Title Page 2, Column 2, Item (56) (Other Publications)
Line 11, Delete "acethylacetonate" and insert -- acetylacetonate --, therefor.

Column 1
Line 8 (Approx.), Delete "PCT/US2008/050996," and insert -- PCT/US2008/050966, --, therefor.

Column 1
Line 30, Delete "zinc oxo" and insert -- zinc-oxo --, therefor.

Column 4
Lines 4-5, Delete "titanium oxo" and insert -- titanium-oxo --, therefor.

Column 4
Line 61, Delete "zinc oxo" and insert -- zinc-oxo --, therefor.

Column 7
Line 11, Delete "Scheller's" and insert -- Scherrer's --, therefor.

Column 7
Line 31, Delete "Japan)." and insert -- Japan. --, therefor.

Column 7
Line 46, Delete "zinc oxo" and insert -- zinc-oxo --, therefor.

Column 10
Line 55, Delete "(a" and insert -- a --, therefor.

Signed and Sealed this
Twenty-seventh Day of November, 2012

David J. Kappos
*Director of the United States Patent and Trademark Office*

Columns 17-18
Lines 34-41 (Col. 17) 1-3 (Col. 18), In Claim 1, delete "A method of making a catalyst, comprising the steps of: providing a plurality of crystalline anatase titania nanoparticles,
  wherein at least some of the nanoparticles possess a multi-domain composite structure comprising at least zinc-oxo domains and titanium-oxo domains;
  etching the nanoparticles with an acidic etchant so as to remove at least a portion of the zinc-oxo domains from at least some of the nanoparticles; and, depositing gold clusters of dimensions of about 0.5 nm to about 50 nm onto the etched nanoparticles." and insert -- A method of making a catalyst, comprising the steps of: providing a plurality of crystalline anatase titania nanoparticles,
  wherein at least some of the nanoparticles possess a multi-domain composite structure comprising at least zinc-oxo domains and titanium-oxo domains;
  etching the nanoparticles with an acidic etchant so as to remove at least a portion of the zinc-oxo domains from at least some of the nanoparticles; and,
    depositing gold clusters of dimensions of about 0.5 nm to about 50 nm onto the etched nanoparticles. --, therefor.

Column 18
Line 17, In Claim 6, after "m2/g" insert -- . --.